United States Patent
Kähkönen et al.

(10) Patent No.: US 10,742,034 B2
(45) Date of Patent: Aug. 11, 2020

(54) ARRANGEMENT FOR REACTIVE POWER COMPENSATION

(71) Applicant: General Electric Technology GmbH, Baden (CH)

(72) Inventors: Antero Kähkönen, Rauma (FI); Sami Kuusinen, Ylöjärvi (FI)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/477,727

(22) PCT Filed: Jan. 12, 2018

(86) PCT No.: PCT/EP2018/050757
§ 371 (c)(1),
(2) Date: Jul. 12, 2019

(87) PCT Pub. No.: WO2018/130653
PCT Pub. Date: Jul. 19, 2018

(65) Prior Publication Data
US 2019/0363538 A1    Nov. 28, 2019

(30) Foreign Application Priority Data
Jan. 13, 2017   (EP) .................................. 17151502

(51) Int. Cl.
*H02J 3/18* (2006.01)
*H02M 7/483* (2007.01)
*H02J 3/20* (2006.01)

(52) U.S. Cl.
CPC .......... *H02J 3/1842* (2013.01); *H02J 3/1864* (2013.01); *H02J 3/20* (2013.01); *H02M 7/483* (2013.01)

(58) Field of Classification Search
CPC ........ H02J 3/1842; H02J 3/185; H02J 3/1857; H02J 3/1864; H02M 7/08; H02M 7/17; H02M 7/23; H02M 7/483
See application file for complete search history.

(56) References Cited

U.S. PATENT DOCUMENTS 8,866,338 B2 *  10/2014  Scott ..................... H02J 3/1864
                                                          290/7
2010/0109616 A1    5/2010  Li et al.
(Continued)

FOREIGN PATENT DOCUMENTS

CN       1588746 A     3/2005
CN     101420128 A     4/2009
(Continued)

OTHER PUBLICATIONS

English translation CN 101567565 (Year: 2009).*
International Search Report and Written Opinion, PCT/EP2018/050757, dated Mar. 27, 2018 (8 pp.).

*Primary Examiner* — Nguyen Tran
(74) *Attorney, Agent, or Firm* — Eversheds Sutherland (US) LLP

(57) ABSTRACT

In the presented solution reactive power is compensated for in connection with a power transmission line with an arrangement which comprises at least one transformer and at least one reactive power compensator. The at least one reactive power compensator comprises a voltage source converter and switched elements. The switched elements may be thyristor switched capacitors and/or thyristor switch reactors, for example. The voltage source converter may provide reactive power in a linear or step less manner. The transformer is a three winding transformer having a high voltage side connectable to the power transmission line, a (Continued)

first low voltage side connected to the voltage source converter and a second low voltage side connected to the switched elements.

5 Claims, 1 Drawing Sheet

(56) References Cited

U.S. PATENT DOCUMENTS

2014/0268926 A1* 9/2014 Gupta .................... H02M 5/44
363/35
2017/0353101 A1* 12/2017 Li ........................... H01F 38/14

FOREIGN PATENT DOCUMENTS

CN 101567565 A 10/2009
EP 2747233 A1 6/2014

* cited by examiner

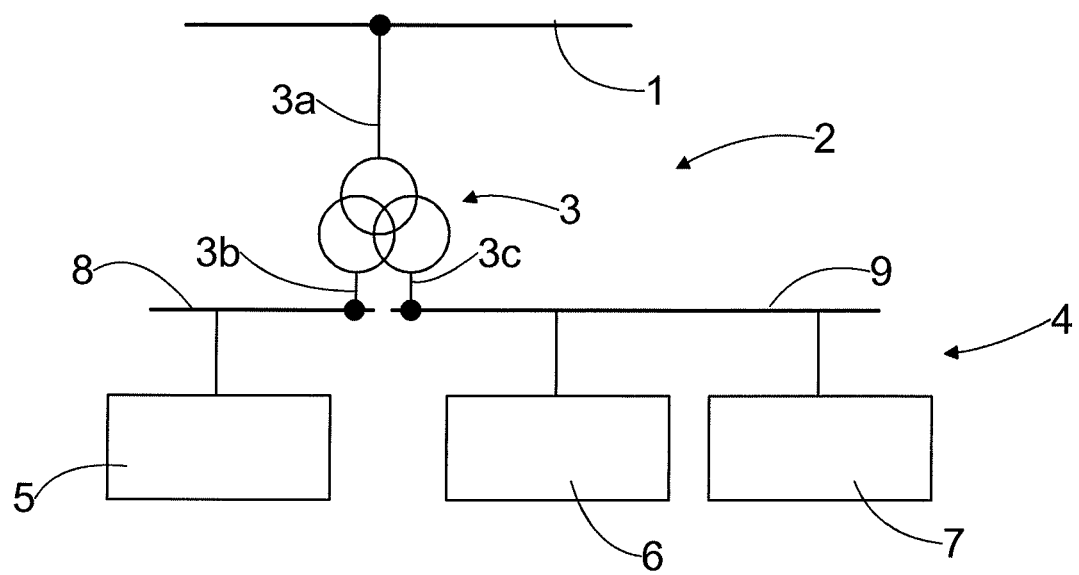

ARRANGEMENT FOR REACTIVE POWER COMPENSATION

RELATED APPLICATIONS

This application claims priority to International Patent Application Serial No. PCT/EP2018/050757, titled "Arrangement for Reactive Power Compensation", filed Jan. 12, 2018, which claims priority to Europe Application Serial No. 17151502.6.0, titled "Arrangement for Reactive Power Compensation", filed Jan. 13, 2017, the contents of which are both incorporated herein by reference.

FIELD OF THE INVENTION

The invention relates to an arrangement for reactive power compensation in connection with a power transmission line.

BRIEF DESCRIPTION OF THE INVENTION

It is an object of the present invention to provide a novel and improved arrangement for reactive power compensation in connection with the power transmission line.

The invention is characterized by what is stated in the independent claims. Embodiments of the invention are disclosed in the dependent claims.

In the presented solution reactive power is compensated for in connection with a power transmission line with an arrangement which comprises at least one transformer and at least one reactive power compensator. The at least one reactive power compensator comprises a voltage source converter and switched elements. The switched elements may be thyristor switched capacitors and/or thyristor switch reactors, for example. The voltage source converter may provide reactive power in a linear or stepless manner. The transformer is a three winding transformer having a high voltage side connectable to the power transmission line, a first low voltage side connected to the voltage source converter and a second low voltage side connected to the switched elements. Because the transformer comprises two secondaries it is possible to optimize the voltage levels of the first and second low voltage sides. Thus the voltage level of the first low voltage side may differ from the voltage level of the second low voltage side whereby both the voltage source converter and switched elements may be arranged such that they are positioned on an optimized voltage level. Furthermore, the transformer coupling reactance provides damping between the first low voltage side and the second low voltage side whereby transients caused by switching of the switched elements do not affect the voltage source converter operation in a harmful manner. Furthermore, it is possible to optimize the transformer impedance between the high voltage side and the first low voltage side and the transformer impedance between the high voltage side and the second low voltage side such that resonance between switched elements and the network impedance is avoided but simultaneously the impedance between the high voltage side and the first low voltage side may be so low that voltage fluctuation in connection with the voltage source converter is low.

BRIEF DESCRIPTION OF THE DRAWINGS

In the following the invention will be described in greater detail by means of embodiments with the reference to the attached drawings, in which FIG. 1 schematically shows an arrangement for reactive power compensation.

DETAILED DESCRIPTION OF THE EMBODIMENTS

FIG. 1 shows an arrangement for reactive power compensation in connection with a power transmission line 1 schematically. The power transmission line 1 may be, for instance, a power transmission line of a high voltage network. The voltage level of the power transmission line may typically be 115 kV, 230 kV or 380 kV, for example.

The arrangement 2 for reactive power compensation comprises a transformer 3 and a reactive power compensator 4. The transformer 3 is a three winding transformer. The reactive power compensator 4 comprises a voltage source converter (VSC) 5 and switched elements. The switched elements may comprise thyristor switched capacitors (TSC) and/or thyristor switched reactors (TSR) denoted by reference numeral 6. The switched elements may also comprise mechanical switched reactive elements (MSRE) 7.

The voltage source converter VSC provides for reactive power compensation in a linear/stepless manner. The power range of the voltage source converter VSC is extended by the switched elements. Thus, by providing a +−200 MVAr VSC and +200 MVAr TSC, a compensator having a +400 MVAr to −200 MVAr operation range is achieved.

The arrangement 2 may comprise a VSC bus whereby the voltage source converter VSC is connected to the VSC bus. The arrangement 2 may also comprise a switch bush 9. The thyristor switched capacitors, thyristor switched reactors and mechanically switched reactive elements are connected to the switch bus 9.

The high voltage side 3a of the three winding transformer 3 is connected to the point of common coupling (PCC) of the power transmission line 1 when the arrangement 2 is in use. The first low voltage side 3b of the three winding transformer 3 is connected to the VSC bus 8. The second low voltage side 3c of the three winding transformer 3 is connected to the switch bus 9.

The three winding transformer 3 has three different voltage levels. The voltage level of the high voltage side 3a is the voltage level of the point of common coupling PCC. According to an embodiment the voltage level of the high voltage side 3a may be 380 kV, for example.

The second voltage level is the voltage level of the first low voltage side 3b which is the voltage level of the VSC bus 8. According to an embodiment, when the voltage level of the high voltage side 3a is 380 kV the voltage level of the VSC bus 8 may be 36 kV, for example.

The third voltage level is the voltage level of the second low voltage side 3c which is the voltage level of the switch bus 9. According to an embodiment, when the voltage level of the high voltage side 3a is 380 kV and the voltage level of the VSC bus 8 is 36 kV the voltage level of the switch bus 9 may be 24 kV, for example.

The reason for the need of different voltage level is that the voltage source converter VSC comprises insulated gate bipolar transistors (IGBT). The optimum voltage for an IGBT differs from the optimum voltage level of thyristors. In the presented solution the voltage levels for both the VSC and the TSR/TSC may be optimized. Thus, the voltage level of the VSC bus may be rather high. A rather high voltage level in connection with the VSC bus provides the advantage that the need for the amount of parallel connected VSC may be minimized.

The switching of the switched elements causes transients that will affect the VSC operation. In the presented solution the transformer coupling reactance provides for damping between the second low voltage side 3c and the first low voltage side 3b. Therefore the switching transients do not harmfully affect the VSC.

The switched elements may have resonant points with the network impedance. By adjusting the connecting transformer impedance this resonance can easily be avoided. Typically the transformer impedance is adjusted to be rather high.

In order to decrease the voltage fluctuation of the VSC bus 8 it is advantageous that the transformer impedance between the high voltage side 3a and the first low voltage side 3b is rather low. When the voltage fluctuation in the VSC bus is low also the number of VSC modules is small.

According to an embodiment the impedance between the high voltage side 3a and the first low voltage side 3b is 10%, the impedance between the high voltage side 3a and the second low voltage side 3c is 20% and the impedance between the first low voltage side 3b and the second low voltage side 3c is 55%.

It will be obvious to a person skilled in the art that, as technology advances, the inventive concept can be implemented in various ways. The invention and its embodiments are not limited to the examples described above but may vary within the scope of the claims.

The invention claimed is:

1. An arrangement for reactive power compensation in connection with a power transmission line, the arrangement comprising
at least one transformer and
at least one reactive power compensator comprising
a voltage source converter (VSC) and
switched elements,
wherein the, transformer is a three winding transformer having a high voltage side connectable to the power transmission line, a first low voltage side connected to the voltage source converter (VSC) and a second low voltage side connected to the switched elements:
wherein an impedance of the transformer between the high voltage side and the first low voltage side is lower than an impedance of the transformer between the high voltage side and the second low voltage side such that resonance between the switched elements and network impedance is reduced and a voltage fluctuation of a VSC bus is decreased.

2. An arrangement as claimed in claim 1, wherein the arrangement comprises the VSC bus between the first low voltage side and the voltage source converter (VSC) and a switch bus between the second low voltage side and the switched elements.

3. An arrangement as claimed in claim 1, wherein the voltage level of the first low voltage side differs from the voltage level of the second low voltage side.

4. An arrangement as claimed in claim 1, wherein the voltage source converter (VSC) comprises insulated gate bipolar transistors.

5. An arrangement as claimed in claim 1, wherein the switched elements comprise thyristor switched capacitors (TSC) and/or thyristor switched reactors (TSR).

* * * * *